Jan. 17, 1939.   L. H. SLOCUMB   2,144,419
PIPE CLEANING DEVICE
Filed Nov. 5, 1937
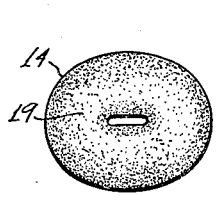
Fig. 2.
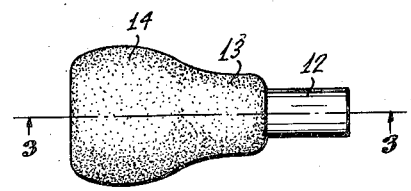
Fig. 1.
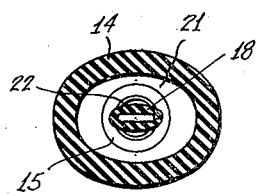
Fig. 5.
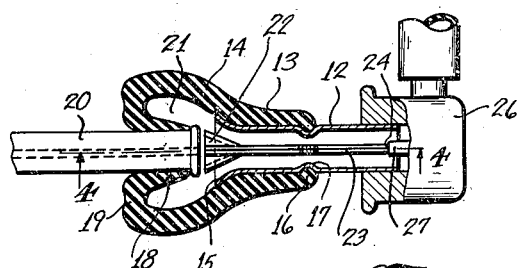
Fig. 3.
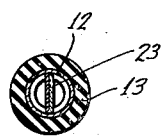
Fig. 6.
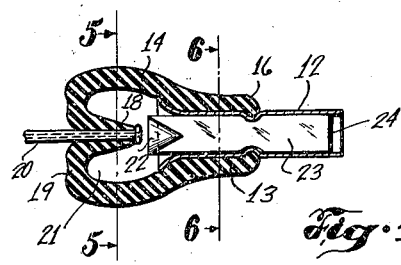
Fig. 4.
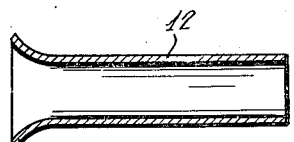
Fig. 8.
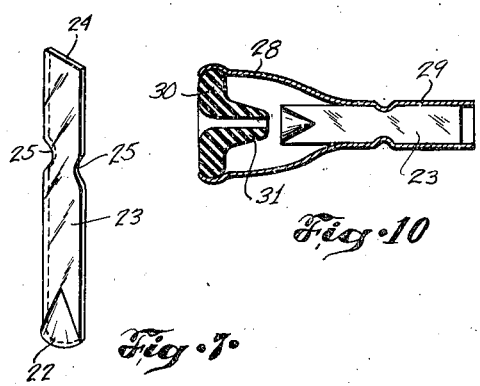
Fig. 10.
Fig. 7.
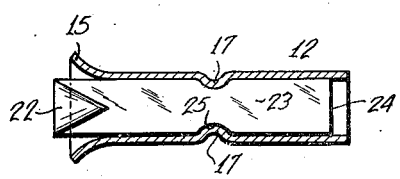
Fig. 9.
INVENTOR
LEITH H. SLOCUMB
By Lawrence H. Cohn
ATTORNEY Patented Jan. 17, 1939

2,144,419

UNITED STATES PATENT OFFICE 2,144,419

PIPE CLEANING DEVICE

Leith H. Slocumb, Ferguson, Mo.

Application November 5, 1937, Serial No. 172,941

7 Claims. (Cl. 131—13)

This invention relates to pipe coupling means, and more particularly to an improved device of this character which is especially adapted for connecting the stem of a tobacco pipe to a hose supplying air under pressure such as is available at all modern automobile service stations, whereby to subject the pipe bore to a high velocity air stream to rid the bore of undesirable moisture, tobacco particles and condensation products.

Generally stated, the object of the invention is to provide a pipe connector for the described purpose which is extremely simple and economical of manufacture, and embodies certain improved features which adapts it for use with pipe stems of various sizes and shapes. More specifically an object of the invention is attained in the novel construction and arrangement of parts which enables the pressure of the supplied air to be utilized for producing a tight, leak-proof connection between the device and the pipe stem.

These and other objects and advantages will be fully explained in the following description of several embodiments of the invention.

In the accompanying drawing, Figs. 1 and 2 are plan and end views respectively, of one form of the device; Fig. 3 is a longitudinal sectional view taken at line 3—3 of Fig. 2; Fig. 4 is a longitudinal sectional view as taken at line 4—4 of Fig. 3; Figs. 5 and 6 are transverse sectional views taken at lines 5—5 and 6—6, respectively, of Fig. 4; Fig. 7 is a perspective view of one of a pair of coacting strips which, in the assembled device, are disposed within the stem portion of the coupler; Fig. 8 is a longitudinal view of a tube which comprises the stem portion of the coupler; Fig. 9 is a longitudinal sectional view of the stem assembly, and Fig. 10 is a longitudinal sectional view of a modified form of the device.

Referring now by numerals of reference to the drawing and particularly to Fig. 3 illustrating one structural embodiment of the invention, 12 denotes a metal tube which projects axially from the neck portion 13 of a hollow, substantially pear-shaped body member or nipple 14, such nipple being formed of flexible, resilient material, preferably rubber. The inner end of the tube 12 is desirably flared as indicated at 15, being fashioned to conform to and fit snugly against the rounded internal shoulder of the nipple where its neck portion merges into the enlarged body thereof. The neck portion 13 tightly embraces the tube 12 and terminates in an annular lip 16 which fits snugly within an annular depression formed by a restricted portion 17 of the tube, the portion 17 having a further purpose to be hereinafter explained. If desired the tube and nipple may be positively united by cement to assure the presence of an air tight junction at their contacting surfaces, but where a substantial length of the tube is lapped by the neck of the nipple as shown, cementing of the parts has been found unnecessary.

The nipple 14 is provided with a re-entrant throat portion 18, in axial alinement with tube 12 and projecting inwardly from the end wall 19, the throat 18 tapering toward its innermost end which is spaced forwardly a short distance from the flared extremity of the tube. The throat is adapted to receive the bit portion 20 of a tobacco pipe, or the like, and to provide an air-tight seal around the same, the throat conforming to pipe stems of various sizes and shapes and being sufficiently flexible to permit the pipe stem to be easily inserted and withdrawn.

It will be noted that an annular chamber or pocket 21 is formed in the enlarged portion of the nipple body, such pocket encircling the throat 18 and communicating with the passage through tube 12. Air issuing from the flared end of the tube 12 is prevented from passing directly or rectilinearly into a pipe stem in throat 18, by means of conical deflector 22 which confronts the end of the pipe stem and is spaced centrally of the flared nozzle portion 15 of the tube. The conical deflector causes the air to issue from the nozzle in an annular stream which is directed toward the annular pocket 21, a part of the air being trapped thereby. The entrapped air exerts pressure against the sides of throat 18, constricting the same about the pipe stem so that an effective air-seal is created between the contacting surfaces of the pipe stem and throat portion even though the pipe stem is of relatively small circumference and initially fits somewhat loosely in the throat. It will appear further that the deflector 22 prevents the air from impinging on the end of the pipe stem which, if the air is acting under great pressure, would tend to blast the pipe stem from the throat portion.

In the present example the conical deflector 22 is formed on the end of a flat, elongate shank 23 which is secured within tube 12 and terminates a small distance short of the outer end of the tube, the shank presenting a transverse end surface 24 toward the mouth of the tube. The shank 23 with its conical deflecting head 22 may, for purposes of manufacturing economy, as in the present example, be formed by a pair of metal strips of width equal to the internal diameter of the tube, each of such strips having a semi-conical deformation at one of its ends as illustrated in Fig. 7. The strips are provided further with oppositely disposed edge indentations or recesses 25, creating a zone of restricted width between the said recesses. The strips thusly fashioned are placed together with their end deformations arranged in complemental relation to form the conical deflector 22, and the composite strip is secured in place within the tube 12 by rolling or crimping a circular zone of the same to produce the restricted portion 17, previously referred to, which embraces the recessed portion of the composite shank. Thus the strips are formed, united and secured in place within the tube in a simple and highly economical manner.

The device thus described is adapted for application to the head fitting of a service station air hose for inflating automobile tires. One of such head fittings, designated 26, is illustrated in Fig. 3, 27 denoting its valve pin which, when depressed, opens a valve to release air normally held in check thereby.

In use, the stem of a tobacco pipe or similar article is inserted into the passage of throat 18 which, due to its flexibility and resiliency, adjusts itself to accommodate pipe stems of various shapes and sizes. The head fitting of an air hose is next applied to the mouth of tube 12 and the air valve caused to be opened by the displacement of its valve pin 27 by the shank 23. Thus the chamber 21 is brought into direct communication with the supply reservoir and while the pressure in the chamber 21 is somewhat reduced below the supply pressure, due to the flow of air through the pipe stem, the pressure of the air trapped in the chamber, acting against the sides of the throat will cause the throat to be pressed tightly against the pipe stem and prevent leakage from between their contacting surfaces. Air passes out of the chamber at high velocity through the relatively restricted passage in the pipe stem and blows therefrom any particles of tobacco, moisture or other undesirables which tend to clog and foul the same.

Fig. 10 illustrates my invention in a slightly modified form, differing from the structure previously described in that the body portion 28 of the modification is formed as an integral enlargement at one end of the tubular stem portion 29. The enlarged body portion is closed by a rubber washer 30 having an inwardly directed throat 31 for receiving the pipe stem. In all other respects the modification may be identical to the form of the device illustrated in Fig. 3.

From the foregoing description it will appear that I have devised a pipe cleaning attachment which is simple and economical of manufacture and highly suitable for its intended purpose.

I claim:

1. A cleaning attachment for tobacco pipes comprising a hollow body member, a tubular neck projecting from one end of the body member for connecting the same to a supply of air under pressure, a reentrant throat portion at the opposite end of said body, said throat portion being formed of rubber and adapted to receive a pipe stem in sealing engagement therewith, and air deflecting means confronting the inner end of said throat portion and disposed in the path of air issuing from said neck into the body member.

2. A pipe cleaning attachment comprising a tubular stem terminating at one end in an enlarged hollow body, said body having an end closure provided with a reentering throat portion of flexible, resilient material directed inwardly of the body coaxial with the stem passage, said stem being adapted to conduct air under pressure into the enlarged body portion, said throat being adapted to receive and frictionally embrace a pipe stem, and means in said body confronting the inner end of said throat for deflecting air issuing from the stem toward the sides of the body.

3. A pipe cleaning attachment comprising a tubular body terminating at one end in a reentering throat portion formed of resilient material, said throat portion being adapted to receive and frictionally embrace a pipe stem and defining an annular chamber within the body, the body at its opposite end being of reduced diameter, providing an inlet passage for air under pressure, and deflecting means disposed in confronting, spaced relation to the inner end of said throat for directing the entering air into the annular chamber and preventing the same from impinging the end of a pipe stem disposed in said throat.

4. A pipe cleaning adjunct comprising a hollow body, a tube projecting from, and opening into said body for conducting a supply of air under pressure to said body, deflecting means adjacent the outlet end of the tube for causing air to issue therefrom in a divergent stream, said body having a reentering throat portion of flexible, resilient material, adapted to receive and frictionally embrace a pipe stem, said throat portion being disposed coaxial with the tube and terminating forwardly of said deflecting means.

5. A cleaning adjunct for tobacco pipes comprising a tubular receiver having an axially extending neck portion of reduced diameter for connecting the receiver to a supply of air under pressure, a reentering rubber throat on the end of the body opposite its neck portion, said throat being adapted to receive a pipe stem in sealing engagement therewith, and a substantially conical deflector disposed in the path of air emerging from the neck portion, the base of said deflector confronting the inner end of said throat.

6. A cleaning attachment for tobacco pipes comprising a hollow, pear-shaped body having an axially extended tubular neck portion forming an inlet passage for compressed air, said body having a reentering throat formed of rubber which is adapted to receive and form an air-seal about a pipe stem inserted therein, said throat extending in axial alinement with said neck portion, a member secured within the neck portion and extending longitudinally therethrough, the inner end of said member being formed to provide a deflector for preventing air from flowing rectilinearly through the body into the pipe stem, the outer end of said member providing an abutment for the valve pin of a conventional air hose coupling member.

7. A cleaning attachment for tobacco pipes comprising a hollow rubber body having a tubular neck portion at one of its ends, a throat portion reentering the body from its opposite end and defining an annular air pocket therearound, said throat portion being adapted to receive a pipe stem, a metal tube sealed within and projecting from said neck portion for connection with the coupler fitting of a compressed air hose, an elongate strip secured within said tube adapted for operating engagement with the coupler valve pin, said strip terminating in a substantially conical formation at the discharge end of the tube for directing air into said annular pocket, whereby the pressure of the air trapped in said pocket tends to constrict said throat portion into tight, sealing engagement with the pipe stem.

LEITH H. SLOCUMB.